US012779562B2

(12) United States Patent
Okamura et al.

(10) Patent No.: US 12,779,562 B2
(45) Date of Patent: Nov. 3, 2026

(54) ELECTRIC WORK MACHINE

(71) Applicant: MAKITA CORPORATION, Anjo (JP)

(72) Inventors: Masayuki Okamura, Anjo (JP); Takuya Kusakawa, Anjo (JP); Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 361 days.

(21) Appl. No.: 17/751,091

(22) Filed: May 23, 2022

(65) Prior Publication Data

US 2022/0371112 A1 Nov. 24, 2022

(30) Foreign Application Priority Data

May 24, 2021 (JP) ................................ 2021-086989

(51) Int. Cl.
*B23D 49/00* (2006.01)

(52) U.S. Cl.
CPC .................................. *B23D 49/008* (2013.01)

(58) Field of Classification Search
CPC ............................ B23D 49/008; B23D 49/162
See application file for complete search history.

(56) References Cited

U.S. PATENT DOCUMENTS 6,536,536 B1 * 3/2003 Gass ....................... B25F 5/021 173/171
7,318,768 B2 * 1/2008 Deshpande ............. B24B 23/03 451/357
7,928,673 B2 * 4/2011 Woods .................... H02P 29/00 318/34
9,991,825 B1 * 6/2018 Ackerman ................ H02P 7/06
12,440,907 B2 * 10/2025 Dey, IV ................. B23D 51/16
(Continued)

FOREIGN PATENT DOCUMENTS

EP 0893199 A2 * 1/1999 .............. H02P 25/14
JP 2013-226626 A 11/2013
(Continued)

OTHER PUBLICATIONS

Oct. 29, 2024 Office Action issued in Japanese Patent Application No. 2021-086989.
(Continued)

*Primary Examiner* — Boyer D Ashley
*Assistant Examiner* — Samuel A Davies
(74) *Attorney, Agent, or Firm* — Oliff PLC

(57) ABSTRACT

An electric work machine in one aspect of the present disclosure includes a motor, a manual switch, and a control circuit. The control circuit switches a preset control either to be enabled or disabled. During the preset control being enabled, the control circuit (i) varies an actual rotational speed of the motor in accordance with an actual moved distance of the manual switch and (ii) increases the actual rotational speed in response to a load being imposed on the motor. During the preset control being disabled, the control circuit varies the actual rotational speed in accordance with the actual moved distance of the manual switch in a manner at least partly distinctive from a variation in the actual rotational speed during the preset control being enabled.

12 Claims, 8 Drawing Sheets

(56) References Cited

U.S. PATENT DOCUMENTS

| | | | | |
|---|---|---|---|---|
| 2005/0007167 | A1* | 1/2005 | Tange | H02H 9/001 327/172 |
| 2006/0060366 | A1* | 3/2006 | Bodine | B25F 5/001 173/217 |
| 2012/0152583 | A1* | 6/2012 | Yanagihara | H02P 6/17 173/217 |
| 2013/0187587 | A1* | 7/2013 | Knight | H02P 6/16 318/400.37 |
| 2014/0245620 | A1* | 9/2014 | Fankhauser | B23D 51/01 30/392 |
| 2015/0042247 | A1* | 2/2015 | Kusakawa | H02P 7/2913 318/700 |
| 2015/0042254 | A1* | 2/2015 | Kato | G05B 6/02 318/458 |
| 2015/0372633 | A1* | 12/2015 | Machida | B25D 16/00 173/48 |
| 2016/0020443 | A1* | 1/2016 | White | H02J 7/36 318/245 |
| 2016/0342151 | A1* | 11/2016 | Dey, IV | G06F 3/04847 |
| 2017/0012572 | A1* | 1/2017 | Takano | B24B 47/26 |
| 2017/0099025 | A1* | 4/2017 | Ma | H02P 29/024 |
| 2018/0084646 | A1* | 3/2018 | Purohit | H05K 5/0073 |
| 2019/0039227 | A1* | 2/2019 | Takeda | B25F 5/008 |
| 2019/0111550 | A1* | 4/2019 | Kato | B25F 5/00 |
| 2019/0111551 | A1* | 4/2019 | Kato | B25F 5/001 |
| 2021/0143709 | A1* | 5/2021 | Sprague | H02K 7/116 |

FOREIGN PATENT DOCUMENTS

| | | | | |
|---|---|---|---|---|
| JP | 2015035844 | A | * | 2/2015 |
| JP | 2015-188981 | A | * | 11/2015 |
| JP | 2016-7658 | A | | 1/2016 |
| JP | 2017-205014 | A | | 11/2017 |
| JP | 2018202568 | A | * | 12/2018 |
| JP | 2019-72811 | A | | 5/2019 |

OTHER PUBLICATIONS

Mar. 28, 2026 Office Action issued in Chinese Patent Application No. 202210535709.6.

* cited by examiner

| FIRST MAP | | SELECTOR DIAL POSITION | | | | |
|---|---|---|---|---|---|---|
| | | 1 | 2 | 3 | 4 | 5 |
| PULLED DISTANCE OF TRIGGER | 0 | 0 | 0 | 0 | 0 | 0 |
| | 1 | 300 | 300 | 300 | 300 | 300 |
| | 3 | 600 | 600 | 600 | 600 | 600 |
| | 5 | 800 | 900 | 900 | 900 | 900 |
| | 7 | 800 | 1200 | 1200 | 1200 | 1200 |
| | 9 | 800 | 1300 | 1400 | 1400 | 1400 |
| | 11 | 800 | 1300 | 1700 | 1700 | 1700 |
| | 13 | 800 | 1300 | 1900 | 2000 | 2000 |
| | 15 | 800 | 1300 | 1900 | 2300 | 2300 |
| | 17 | 800 | 1300 | 1900 | 2500 | 2500 |
| | 19 | 800 | 1300 | 1900 | 2500 | 2800 |
| | 20 | 800 | 1300 | 1900 | 2500 | 3000 |

| SECOND MAP | | SELECTOR DIAL POSITION | | | | |
|---|---|---|---|---|---|---|
| | | 1 | 2 | 3 | 4 | 5 |
| PULLED DISTANCE OF TRIGGER | 0 | 0 | 0 | 0 | 0 | 0 |
| | 1 | 300 | 300 | 300 | 300 | 300 |
| | 3 | 350 | 400 | 450 | 500 | 600 |
| | 5 | 400 | 500 | 600 | 700 | 900 |
| | 7 | 450 | 600 | 750 | 1000 | 1200 |
| | 9 | 500 | 700 | 900 | 1200 | 1400 |
| | 11 | 550 | 800 | 1050 | 1400 | 1700 |
| | 13 | 600 | 900 | 1200 | 1700 | 2000 |
| | 15 | 650 | 1000 | 1350 | 1900 | 2300 |
| | 17 | 700 | 1100 | 1500 | 2100 | 2500 |
| | 19 | 750 | 1200 | 1700 | 2300 | 2800 |
| | 20 | 800 | 1300 | 1900 | 2500 | 3000 |

| SOFT NO-LOAD ROTATION SPEED | 1400 |
|---|---|

FIG. 3

ELECTRIC WORK MACHINE

CROSS-REFERENCE TO RELATED APPLICATIONS

This application claims the benefit of Japanese Patent Application No. 2021-086989 filed on May 24, 2021 with the Japan Patent Office, the entire disclosure of which is incorporated herein by reference.

BACKGROUND

The present disclosure relates to an electric work machine.

Japanese Patent Application Publication No. 2018-202568 discloses an electric power tool having a soft no-load rotation function, Upon the soft no-load rotation function being executed, a motor of the electric power tool is driven at a specified rotational speed lower than a desired rotational speed set until a load is imposed on the motor. Upon the load being imposed on the motor, the motor is accelerated to the desired rotational speed.

SUMMARY

There is provided an electric power tool whose motor is rotated at a rotational speed (or a rotational frequency) that varies in accordance with a pulled distance of a trigger of the electric power tool. In a case where a soft no-load rotation function is added to such an electric power tool, a user cannot adjust the rotational speed with the trigger during the soft no-load rotation function being enabled (although the user can adjust the rotational speed with the trigger during the soft no-load rotation function being disabled). As a result, the user may not be satisfied with an operability of the electric power tool.

It is desirable that one aspect of the present disclosure can provide an electric work machine with improved operability.

There is provided, in one aspect of the present disclosure, an electric work machine including a motor, a manual switch, and a control circuit. The motor drives a tool that is attached to the electric work machine. The manual switch is manually moved by a user of the electric work machine so as to drive the motor. The control circuit switches a preset control either to be enabled or disabled. During the preset control being enabled, the control circuit (i) varies an actual rotational speed (or an actual rotational frequency) of the motor in accordance with an actual moved distance of the manual switch and (ii) increases the actual rotational speed in response to a load being imposed on the motor. During the preset control being disabled, the control circuit varies the actual rotational speed in accordance with the actual moved distance of the manual switch in a manner at least partly distinctive from a variation in the actual rotational speed during the preset control being enabled.

The electric work machine described above can vary the actual rotational speed in accordance with the actual moved distance of the manual switch during the preset control being enabled. Furthermore, during the preset control being disabled, the actual rotational speed varies in a manner at least partly distinctive from the variation in the actual rotational speed during the preset specified control being enabled. Thus, the user can distinguish occasions to enable or disable the preset control based on physical senses. Accordingly, it is possible to achieve an electric work machine with a further improved operability. The phrase "moved distance(s)" may mean "moved length(s)" and/or "moved angle(s)" in the present disclosure.

BRIEF DESCRIPTION OF THE DRAWINGS

Example embodiments of the present disclosure will be described hereinafter with reference to the accompanying drawings, in which:

FIG. 3 is a diagram showing first and second maps, the first map associating a first group of commanded rotational speeds with pulled distances of a trigger and selector dial positions during a soft no-load rotation control being enabled, and the second map associating a second group of commanded rotational speeds with the pulled distances of the trigger and the selector dial positions during the soft no-load rotation control being disabled;

DETAILED DESCRIPTION OF EXEMPLARY EMBODIMENTS

Overview of Embodiments

Figure 1:
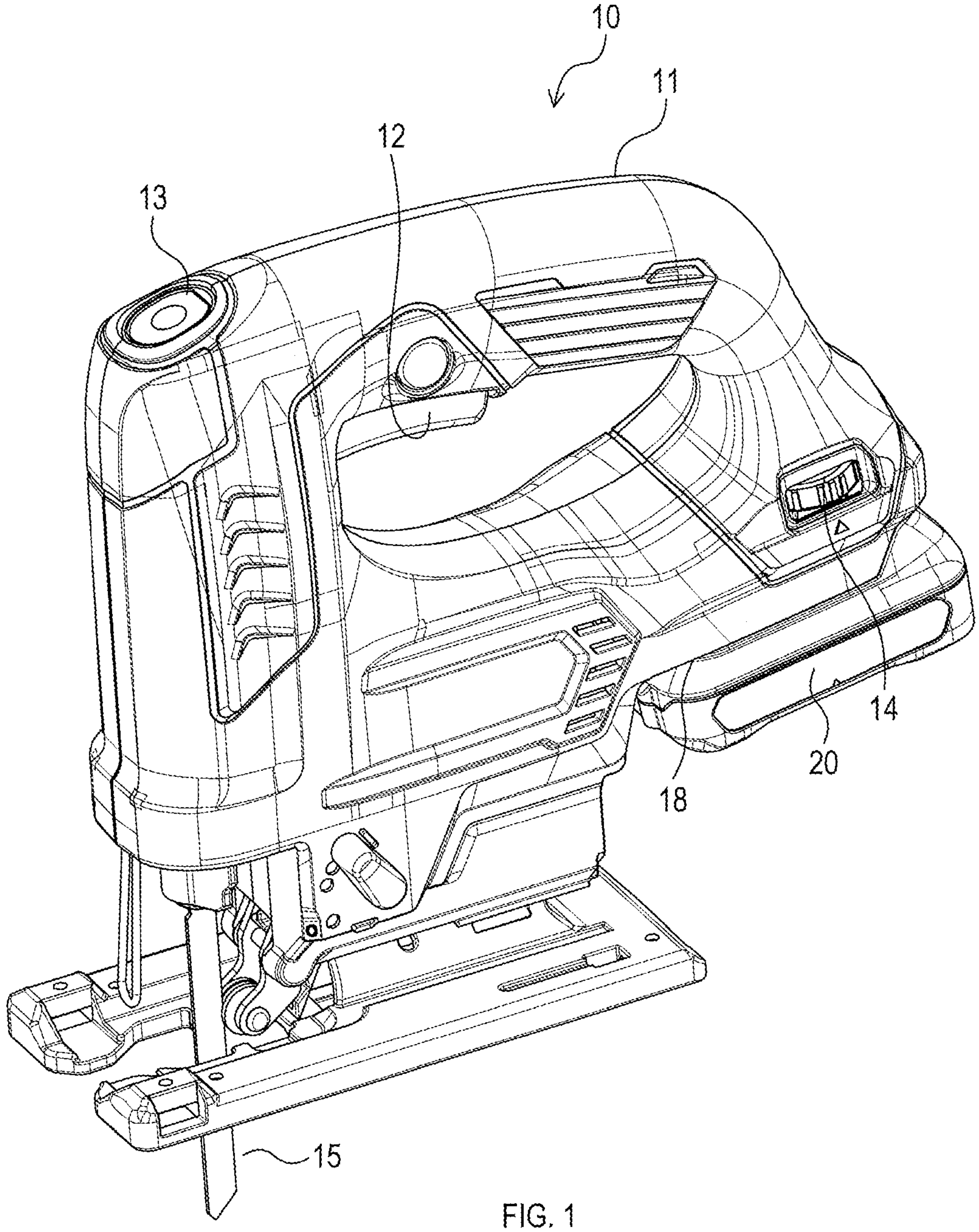
FIG. 1 illustrates an appearance of an electric work machine according to a first embodiment.

In one embodiment, an electric work machine may include a motor, a manual switch, and/or a control circuit. The motor may drive a tool that is attached to the electric work machine. The manual switch may be manually moved by a user of the electric work machine so as to drive the motor. The control circuit may switch a preset control either to be enabled or disabled. The control circuit may, during the preset control being enabled, (i) vary an actual rotational speed (or an actual rotational frequency) of the motor in accordance with an actual moved distance of the manual switch and (ii) increase the actual rotational speed in response to a load being imposed on the motor. The control circuit may, during the preset control being disabled, vary the actual rotational speed in accordance with the actual moved distance of the manual switch in a manner at least partly distinctive from a variation in the actual rotational speed during the preset control being enabled.

In one embodiment, the electric work machine may further include a memory. The memory may store or be configured to store a first correspondence data and a second correspondence data. The first correspondence data may associate a series of moved distances of the manual switch with a first group of rotational speeds (or a first group of rotational frequencies) of the motor. The second correspondence data may associate the series of moved distances of the manual switch with a second group of rotational speeds (or a second group of rotational frequencies) of the motor. The second group of rotational speeds may be at least partly distinctive from the first group of rotational speeds. The control circuit may detect a load imposed on the motor. The control circuit may obtain the actual moved distance of the manual switch. During a preset control being enabled, the control circuit may control an actual rotational speed (or an actual rotational frequency) to be consistent with a first rotational speed (or a first rotational frequency) before the load is imposed on the motor. The first rotational speed may be (i) determined based on the first correspondence data and the actual moved distance of the manual switch obtained and (ii) equal to or less than a specified rotational speed (or a specified rotational frequency). During the preset control being disabled, the control circuit may control the actual rotational speed to be consistent with a second rotational speed (or a second rotational frequency). The second rotational speed may be determined based on the second correspondence data and the actual moved distance of the manual switch obtained. In one embodiment, at least one of these components above may be omitted (eliminated).

In one embodiment where the electric work machine includes all the components above, during the preset control being enabled, the user can manually vary the actual rotational speed until the actual rotational speed reaches the specified rotational speed before the load is imposed on the motor. Accordingly, in the case of the preset control being enabled, the user can manually adjust the actual rotational speed in a low speed range, to thereby determine a position of the electric work machine with respect to a workpiece. Furthermore, in the case of the preset control being disabled, the user can manually vary the actual rotational speed regardless of whether the load is imposed on the motor.

In one embodiment, the electric work machine may further include a setting switch. The setting switch may be manually moved by the user so as to set a maximum rotational speed (or a maximum rotational frequency) of the motor. The second correspondence data may include a third correspondence data and/or a fourth correspondence data. The third correspondence data may associate the series of moved distances with (i) a third group of rotational speeds (or a third group of rotational frequencies) and (ii) a first maximum rotational speed (or a first maximum rotational frequency). The fourth correspondence data may associate the series of moved distances of the manual switch with (i) a fourth group of rotational speeds (or a fourth group of rotational frequencies) and (ii) a second maximum rotational speed (or a second maximum rotational frequency). The fourth group of rotational speeds may be at least partly distinctive from the third group of rotational speeds. The second maximum rotational speed may be distinctive from the first maximum rotational speed. The second rotational speed may be determined based on the maximum rotational speed set via the setting switch, the third correspondence data or the fourth correspondence data, and the actual moved distance obtained. The second rotational speed may be equal to or less than the maximum rotational speed set via the setting switch.

In the electric work machine in the above embodiment, during the preset control being disabled, the second rotational speed may be determined based on the third correspondence data or the fourth correspondence data. Accordingly, during the preset control being disabled, the user can manually adjust the actual rotational speed in accordance with the maximum rotational speed set via the setting switch.

The first correspondence data may further associate the series of moved distances of the manual switch with a group of maximum rotational speeds of the motor. During the preset control being enabled, the control circuit may control the actual rotational speed to be consistent with a third rotational speed (or a third rotational frequency) after the load is imposed on the motor. The third rotational speed may be determined based on the first correspondence data and the actual moved distance of the manual switch obtained. The third rotational speed may be equal to or less than the maximum rotational speed set via the setting switch.

During the preset control being enabled, the third rotational speed may be determined based on the first correspondence data after the load is imposed on the motor. Based on the third rotational speed determined, the actual rotational speed of the motor may be controlled. Accordingly, in the case of the preset control being enabled, the user can manually vary the actual rotational speed at a fixed variation rate without relying on the maximum rotational speed set via the setting switch. That is, the user may have a lesser workload to adjust the actual rotational speed during the preset control being enabled. Thus, it may be possible to improve an operability of the electric work machine.

The control circuit may, during the preset control being enabled, control the actual rotational speed to be consistent with the maximum rotational speed set via the setting switch after the load is imposed on the motor.

In the case of the preset control being enabled, after the load is imposed on the motor, the motor of the electric work machine as such may automatically rotate at a desired speed without relying on the actual moved distance of the manual switch. Accordingly, in the case of the preset control being enabled, the user can work with the electric work machine without adjusting the actual rotational speed.

In one embodiment, the control circuit may, during the preset control being enabled, keep controlling the actual rotational speed to be consistent with the third rotational speed in response to a no-load being imposed on the motor after the load is imposed on the motor.

Even in the case of the no-load being imposed on the motor after the load is once imposed, the electric work machine above can make the actual rotational speed consistent with the third rotational speed. Accordingly, in a case where the load imposed on the motor temporarily decreases during the work, it may be possible to suppress a decrease in the actual rotational speed.

In one embodiment, the control circuit may, during the preset control being enabled, keep controlling the actual rotational speed to be consistent with the maximum rotational speed in response to a no-load being imposed on the motor after the load is imposed on the motor.

Even in the case of the no-load being imposed on the motor after the load is once imposed on the motor, the electric work machine above can make the actual rotational speed consistent with the maximum rotational speed. Accordingly, in a case where the load imposed on the motor temporarily decreases during the work, it may be possible to suppress the decrease in the rotational speed.

In one embodiment, the control circuit may receive a specified signal, to thereby switch the preset control either to be enabled or disabled.

In one embodiment, the electric work machine may further include an additional manual switch. The additional manual switch may be manually moved by the user so as to issue the specified signal. The manual switch, the setting switch, and the additional manual switch may be any types of user interfaces. Examples of the manual switch, the setting switch, and/or the additional manual switch may include a trigger switch, a slide switch, a dial, a touch panel, a touch screen and a graphical user interface.

In one embodiment, the manual switch may output, to the control circuit, an electrical signal corresponding to the actual moved distance of the manual switch. The electrical signal may have a voltage that varies depending on the actual moved distance of the manual switch.

In one embodiment, the control circuit may detect the load imposed on the motor.

In one embodiment, the electric work machine may further include a current detection circuit. The current detection circuit may detect a value of a current flowing through the motor. The control circuit may detect the load imposed on the motor based on the value of the current detected by the current detection circuit.

In one embodiment, there may be provided a method of controlling a motor of an electric work machine, the method including:

- switching a preset control either to be enabled or disabled;
- manually moving a manual switch of the electric work machine so as to drive the motor;
- during the preset control being enabled, (i) varying an actual rotational speed of the motor in accordance with an actual moved distance of the manual switch and (ii) increasing the actual rotational speed in response to a load being imposed on the motor; and/or
- during the preset control being disabled, varying the actual rotational speed in accordance with the actual moved distance of the manual switch in a manner at least partly distinctive from a variation in the actual rotational speed during the preset control being enabled.

Performing the method above brings the same effect(s) as in the electric work machine above.

In one embodiment, the features above may be combined in any manner.

In one embodiment, at least one of the features above may be omitted (eliminated).

SPECIFIC EXEMPLARY EMBODIMENTS

Hereinafter, example embodiments of the present disclosure will be described with reference to the drawings.

1. First Embodiment

1-1. Configuration

There is provided an electric work machine 10 in the first embodiment. Referring to FIG. 1, the electric work machine 10 is a jigsaw.

The electric work machine 10 includes a housing 11. The housing 11 supports a tool 15. The tool 15 is a saw blade (that is, a jigsaw blade). The tool 15 is supported by and can reciprocate with respect to the housing 11. The housing 11 accommodates therein a motor 50 and various circuits to be described later. The motor 50 is mechanically coupled to the tool 15. The tool 15 has a reciprocating speed to be varied in accordance with an actual rotational speed (or an actual rotational frequency) of the motor 50. The reciprocating speed increases in accordance with an increase in the actual rotational speed of the motor 50.

The housing 11 includes a connector 18. The connector 18 is connected to a battery pack 20. The battery pack 20 includes a battery that is repeatedly chargeable and dischargeable. The battery includes two or more battery cells. Examples of the two or more battery cells include lithium ion batteries.

The housing 11 includes a main power switch 13. The main power switch 13 is a tactile switch configured to be manually operated (specifically, pressed) by a user of the electric work machine 10. Every time the main power switch 13 is manually operated, power sources of the various circuits are turned ON and OFF.

The housing 11 includes a trigger 12. The trigger 12 is configured to be manually pulled by the user. Specifically, the trigger 12 is configured to be displaced from a first position to a second position upon being pulled by the user. Upon the user pulling the trigger 12 during the power sources of the various circuits being in ON-states, the motor 50 is driven. In a specified drive mode, the actual rotational speed of the motor 50 varies in accordance with an actual pulled distance of the trigger 12. In the present embodiment, the actual pulled distance of the trigger 12 is indicated in a trigger-pulled level of a twelve-level scale: 0, 1, 3, 5, 7, 9, 11, 13, 15, 17, 19, and 20. The actual pulled distance of the trigger 12 is not limited to the twelve-level scale and may be indicated in a different level-scale therefrom. For example, the actual pulled distance of the trigger 12 may be indicated in ten or twenty-level scale. As the actual pulled distance of the trigger 12 increases, the trigger-pulled level increases. Furthermore, in the present embodiment, the trigger 12 corresponds to one example of the manual switch in the Overview of Embodiments.

The housing 11 includes a speed adjusting selector dial 14. The speed adjusting selector dial 14 is configured to be manually rotated by the user so as to seta maximum value (a desired value) of the rotational speed of the motor 50. The speed adjusting selector dial 14 includes a rotating member. The speed adjusting selector dial 14 has a circumferential surface showing numerals "1" through "5". These numerals represent five maximum values of the actual rotational speed. The user sets either one of the five maximum values via the speed adjusting selector dial 14. The number of numerals shown on the speed adjusting selector dial 14 are not limited to five, and may suffice as long as there are two or more numerals. That is, the maximum value to be set via the speed adjusting selector dial 14 may not necessarily be selected from the five maximum values, and may be selected from at least two or more maximum values. For example, there may be ten or twenty maximum values. Upon a specified numeral of the speed adjusting selector dial 14 being aligned to a specified position (a position given with a triangle mark in FIG. 1) on the housing 11, the maximum value corresponding to the specified numeral is output to a microcomputer 30, which will be described later. The speed adjusting selector dial 14 is configured to be rotated between first and second limit positions. At the first limit position, the numeral "1" is aligned to the specified position on the housing 11. At the second limit position, the numeral "5" is aligned to the specified position. In the present embodiment, the speed adjusting selector dial 14 corresponds to one example of the setting switch in the Overview of Embodiments. The speed adjusting selector dial 14 may be, for example, a speed adjusting slide configured to set the maximum value upon being slid by the user.

Furthermore, the user manually rotates the speed adjusting selector dial 14, to thereby switch drive modes of the motor 50 between first and second drive modes. Specifically, the user rotates the speed adjusting selector dial 14 in a single reciprocating motion between the first and second limit positions, to thereby switch the drive modes. That is, switch operation of the drive modes is (i) to bring the speed adjusting selector dial 14 back to the first limit position after the speed adjusting selector dial 14 is rotated from the first limit position to the second limit position, or (ii) to bring the speed adjusting selector dial 14 back to the second limit position after the speed adjusting selector dial 14 is rotated from the second limit position to the first limit position. The user does not usually perform such a reciprocating operation in order to set the maximum value. Thus, the drive modes are prevented from being unintentionally switched by the user.

The first drive mode enables a soft no-load rotation control. Hereinafter, the term "soft no-load rotation" is also referred to as "soft no-load". The second drive mode disables the soft no-load rotation control. The soft no-load rotation control is a function of the electric work machine 10. When the soft no-load rotation control is enabled, the microcomputer 30 drives the motor 50 so as to set the actual rotational speed to be a specified rotational speed (or a specified rotational frequency) or less until a load is imposed on the motor 50 (that is, until the load on the motor 50 is detected). The specified rotational Speed is the maximum value of the rotational speed set or a soft no-load rotational speed, whichever is lower. When the soft no-load rotation control is enabled, the microcomputer 30 increases the actual rotational speed of the motor 50 from the soft no-load rotational speed in response to the load being imposed on the motor 50 (that is, in response to the load on the motor 50 being detected). The soft no-load rotational speed is preset and relatively low. That is, when enabled, the soft no-load rotation control suppresses an increase in the actual rotational speed of the motor 50 until the load is imposed on the motor 50. This suppresses a vibration of the electric work machine 10 and/or a reaction force from a workpiece (for example, wood material) when the user determines a position of the electric Work machine 10 with respect to the workpiece. Accordingly, the user can easily determine the position of the electric work machine 10 with respect to the workpiece. In the present embodiment, the soft no-load rotation control corresponds to one example of the preset control in the Overview of Embodiments.

Figure 2:
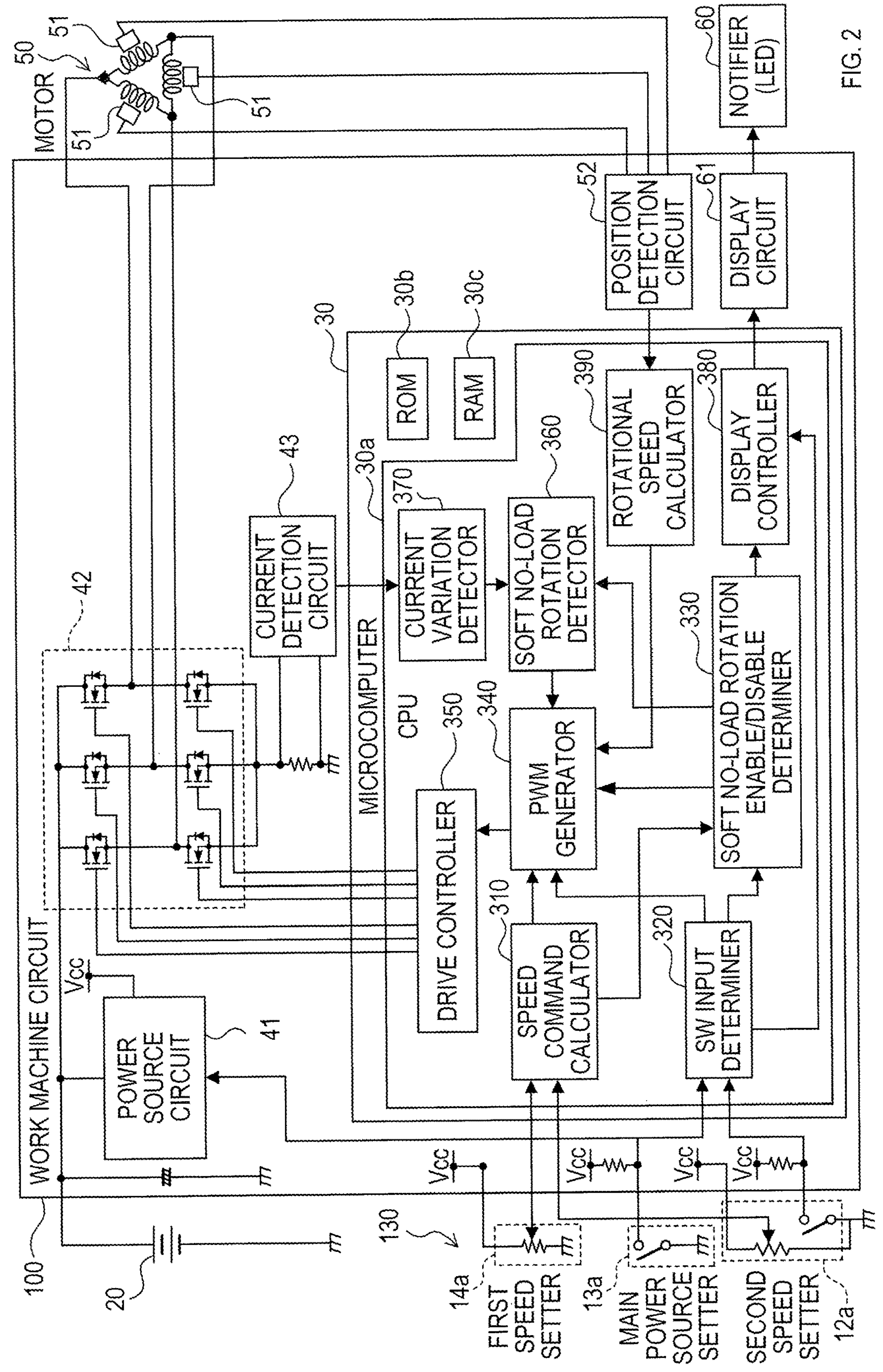
FIG. 2 is a block diagram showing an electrical configuration of the electric work machine according to the first embodiment.

Referring to FIG. 2, descriptions are given to an electrical configuration of the electric work machine 10. The electric work machine 10 includes the motor 50. The motor 50 is a brushless motor including U, V, and W-phase coils.

The electric work machine 10 includes a position sensor 51. The position sensor 51 includes three Hall integrated circuits (ICs) arranged so as to correspond to respective stators of the U, V, and W phases of the motor 50. Every time a rotor of the motor 50 is rotated by a specified angle, the Hall ICs output a rotation detection signal to a position detection circuit 52 to be described later.

The electric work machine 10 includes a switch device 130. The switch device 130 includes a main power setter 13*a*. In response to the main power switch 13 being operated, the main power setter 13*a* outputs a first power-ON signal or a first power-OFF signal to a power supply circuit 41 and a switch input determiner 320, which will be described later. Signals output from the main power setter 13*a* are switched between the first power-ON signal and the first power-OFF signal every time the main power switch 13 is operated.

The switch device 130 includes a first speed setter 14*a*. The first speed setter 14*a* includes a slide resistor. The first speed setter 14*a* outputs a first resistance value signal to a speed command calculator 310 to be described later. The first resistance value signal indicates a first resistance corresponding (or being related) to a selector dial position of the speed adjusting selector dial 14.

The switch device 130 includes a second speed setter 12*a*. The second speed setter 12*a* outputs a second power-ON signal to the switch input determiner 320 in response to the actual pulled distance of the trigger 12 being a specified pulled distance or more. Furthermore, the second speed setter 12*a* outputs a second power-OFF signal to the switch input determiner 320 in response to the actual pulled distance of the trigger 12 being less than the specified pulled distance. Still further, the second speed setter 12*a* includes a slide resistor. The second speed setter 12*a* outputs a second resistance value signal to the speed command calculator 310. The second resistance value signal indicates a second resistance corresponding (or being related) to the actual pulled distance of the trigger 12.

The electric work machine 10 includes a work machine circuit 100. The work machine circuit 100 includes the power supply circuit 41. The power supply circuit 41 is connected to the battery pack 20. Upon receiving the first power-ON signal the power supply circuit 41 generates a specified power supply voltage Vcc from an input electric power. The power supply circuit 41 supplies the power supply voltage Vec to various circuits in the work machine circuit 100, such as the microcomputer 30.

The work machine circuit 100 includes a motor driver 42. The motor driver 42 is a three-phase full-bridge circuit. The three-phase full-bridge circuit includes three high-side switching elements and three low-side switching elements. The motor driver 42 is connected between the battery pack 20 and the motor 50. The motor driver 42 receives an electric power from the battery pack 20 and supplies an electric current to a winding of each phase of the motor 50. Each switching element of the motor driver 42 is turned ON or OFF in response to a control command output from the microcomputer 30.

The work machine circuit 100 includes a current detection circuit 43. The current detection circuit 43 detects a value of a current flowing through the motor 50. The current detection circuit 43 outputs, to a current variation detector 370, a detection signal corresponding to a current value detected (detected current value). The current variation detector 370 will be described later.

The work machine circuit 100 includes a position detection circuit 52. The position detection circuit 52 detects a rotational position of the rotor of the motor 50 based on the rotation detection signal input from the position sensor 51. The position detection circuit 52 outputs, to the microcomputer 30, a positional signal corresponding to a rotational position detected (detected rotational position).

The work machine circuit 100 includes the microcomputer 30. The microcomputer 30 includes a central processing unit (CPU) 30*a*, a read-only memory (ROM) 30*b*, a random access memory (RAM) 30*c*, and an input/output (I/O). Various functions of the microcomputer 30 are performed when the CPU 30*a* executes a program stored in a non-transitory tangible storage medium. In the present embodiment, the ROM 30*b* corresponds to the non-transitory tangible storage medium. By the CPU 30*a* executing this program, a method(s) corresponding to the program is/are carried out. Some of or the entirety of the various functions to be performed by the CPU 30*a* may be achieved by hardware, such as two or more ICs. Furthermore, the microcomputer 30 may be in the form of a single microcomputer, or include two or more microcomputers. The ROM 30*b* stores first and second maps (graphs, lookup tables, etc.) to be described later. Still further, the ROM 30*b* stores soft no-load rotation settings. The soft no-load rotation settings are to enable and disable the soft no-load rotation control. In the present embodiment, the ROM 30*b* corresponds to one example of the memory in the Overview of Embodiments.

The various functions of the microcomputer 30 include the speed command calculator 310, the switch input determiner 320, a soft no-load rotation enable/disable determiner 330, a pulse-width modulation (PWM) generator 340, a drive controller 350, a soft no-load rotation detector 360, the current variation detector 370, a rotational speed calculator 390, and an indicator controller 380. In the present embodiment, the microcomputer 30 includes all the various functions described above. In another embodiment, however, one or more functions of the above-described various functions may be omitted (deleted).

The speed command calculator 310 calculates a commanded value of the actual rotational speed (hereinafter, also referred to as "commanded rotational speed") based on (i) the first resistance value signal, (ii) the second resistance value signal, and (iii) the first or second map. That is, the speed command calculator 310 calculates the commanded rotational speed based on (i) the selector dial position of the speed adjusting selector dial 14, (ii) the actual pulled distance of the trigger 12, and (iii) the first or second map.

The first map shows a first correspondence data. The second map shows a second correspondence data. Each of the first and second correspondence data shows the commanded rotational speed with respect to the actual pulled distance of the trigger 12.

During the soft no-load rotation control being enabled, the speed command calculator 310 calculates the commanded rotational speed based on the first map. FIG. 3 shows one example of the first map. In the first map, the commanded rotational speed increases as the actual pulled distance of the trigger 12 increases. Upon the commanded rotational speed reaching the maximum value (i.e. desired value), the commanded rotational speed is fixed even when the actual pulled distance of the trigger 12 increases. In the first map, regardless of a variation in the maximum value (that is, the selector dial position), the commanded rotational speed is the same with respect to the same pulled distance of the trigger 12. In other words, regardless of the variation in the maximum value, the speed command calculator 310 calculates the same commanded rotational speed with respect to the same pulled distance of the trigger 12 based on the first map until the commanded rotational speed reaches the maximum value.

For example, when the selector dial position is "2", the maximum value is set to 1300 (rpm). When the selector dial position is "4", the maximum value is set to 2500 (rpm). Regardless of whether the selector dial position is "2" or "4", the commanded rotational speed increases, at the same increase rate, as the actual pulled distance of the trigger 12 increases between the trigger-pulled levels 0 through 7. When the selector dial position is "2", the commanded rotational speed reaches the maximum value upon the trigger-pulled level reaching "9". Then, the commanded rotational speed is fixed to the maximum value between the trigger-pulled levels 9 through 20. On the other hand, when the selector dial position is "4", the commanded rotational speed increases as the actual pulled distance of the trigger 12 increases between trigger-pulled levels 0 through 15. Upon the trigger-pulled level reaching "17", the commanded rotational speed reaches the maximum value. Then, the commanded rotational speed is fixed to the maximum value between the trigger-pulled levels 17 through 20.

During the soft no-load rotation control being executed while being enabled, (that is, before the load is imposed on the motor 50), the speed command calculator 310 calculates the commanded rotational speed, based on the first map, so as to set the actual rotational speed to be the specified rotational speed or less. A speed range from "0" (zero) to the soft no-load rotational speed corresponds to the first speed variation range. The soft no-load rotational speed is preset to 1400 (rpm) in the present embodiment. Thus, when the selector dial position is "1" or "2", the speed command calculator 310 calculates the commanded rotational speed, based on the first map, so as to set the actual rotational speed to be the maximum value set (set maximum value) or less. That is, the set maximum value is the specified rotational speed. Furthermore, when the selector dial position is "3", "4", or "5", the speed command calculator 310 calculates the commanded rotational speed, based on the first map, so as to set the actual rotational speed to be the soft no-load rotational speed or less. That is, the soft no-load rotational speed is the specified rotational speed.

Still further, during the soft no-load rotation control being enabled but cancelled (that is, after the load is imposed on the motor 50), the speed command calculator 310 calculates the commanded rotational speed, based on the first map, so as to set the actual rotational speed to the maximum value or less.

During the soft no-load rotation control being disabled, the speed command calculator 310 calculates the commanded rotational speed based on the second map. FIG. 3 shows one example of the second map. In the second map, the commanded rotational speed increases as the actual pulled distance of the trigger 12 increases. The second correspondence data includes third through seventh correspondence data. The third through seventh correspondence data correspond to respective maximum values that are at least partly distinctive from one another. In the third through seventh correspondence data, the commanded rotational speed with respect to the same pulled distance of the trigger 12 increases as the maximum value increases.

Figure 4:
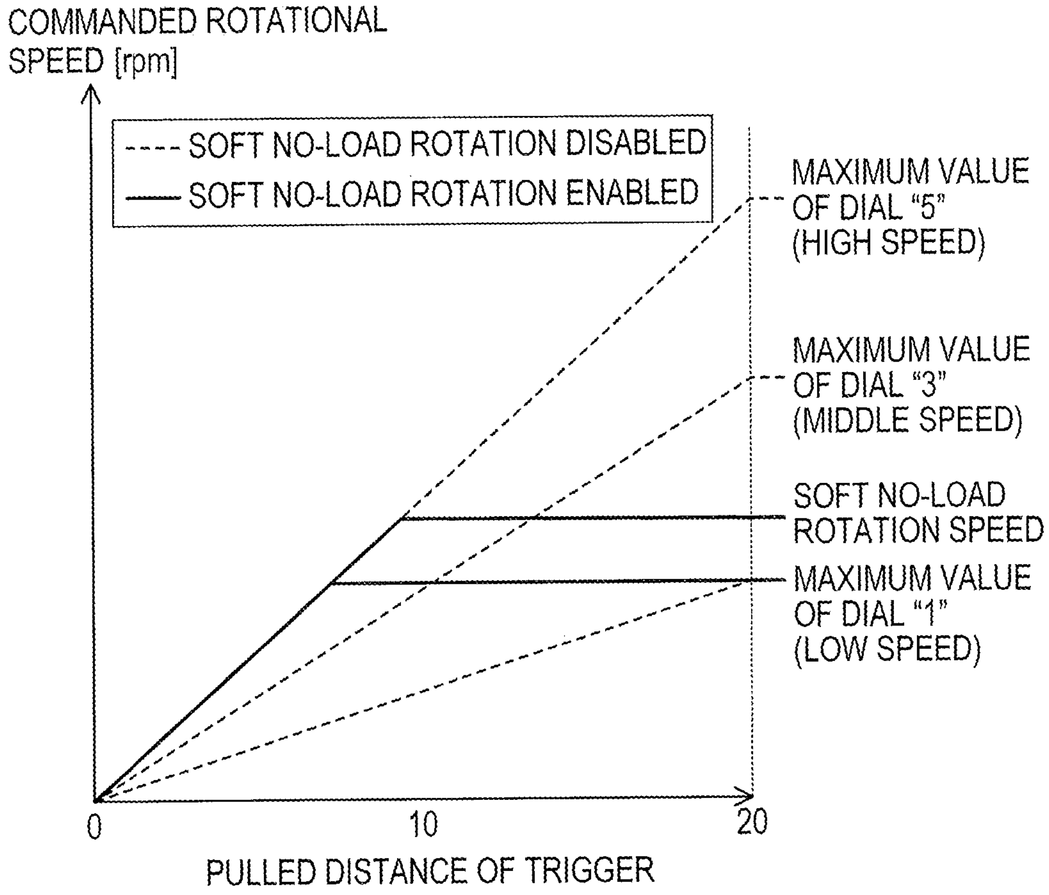
FIG. 4 is a graph, according to the first embodiment, of commanded rotational speeds with respect to an actual pulled distance of the trigger during the soft no-load rotation control of being enabled and disabled.

FIG. 4 is a graph showing the commanded rotational speed with respect to the actual pulled distance of the trigger 12 based on the first and second maps. As shown in FIG. 4, in the present embodiment, the selector dial positions "1" through "4" correspond to the third through sixth correspondence data, respectively. Each of the third through sixth correspondence data is at least partly distinctive from the first correspondence data. Furthermore, in the present embodiment, the selector dial position "5" corresponds to the seventh correspondence data. The seventh correspondence data is the same as the first correspondence data.

Referring back to FIG. 2, the speed command calculator 310 outputs, to the PWM generator 340, the commanded rotational speed calculated. Furthermore, the speed command calculator 310 outputs the first resistance value signal to the soft no-load rotation enable/disable determiner 330.

The switch input determiner 320 outputs a drive-ON signal, when the first and second power-ON signals are input thereto, to the PWM generator 340, the soft no-load rotation enable/disable determiner 330, and the indicator controller 380. Furthermore, the switch input determiner 320 outputs a drive-OFF signal, when at least one of the first or second power-OFF signal is input thereto, to the PWM generator

340, the soft no-load rotation enable/disable determiner 330, and the indicator controller 380.

During the drive-OFF signal being input, the soft no-load rotation enable/disable determiner 330 determines whether to switch the soft no-load rotation control to be enabled or disabled in response to the first resistance value signal indicating a change equivalent to the single reciprocating motion of the speed adjusting selector dial 14. In the present embodiment, the first resistance value signal, which indicates the change equivalent to the single reciprocating motion of the speed adjusting selector dial 14, corresponds to one example of the specified signal in the Overview of Embodiments.

When determining to switch the soft no-load rotation control to be disabled, the soft no-load rotation enable/disable determiner 330 outputs a disablement signal to the PWM generator 340 and the indicator controller 380. Furthermore, when determining to switch the soft no-load rotation control to be enabled, the soft no-load rotation enable/disable determiner 330 outputs an enablement signal to the PWM generator 340 and the indicator controller 380.

The current variation detector 370 detects a current variation and an amount of current increases based on the detection signal input (hereinafter, referred to as "input detection signal").

The soft no-load rotation detector 360 detects the load imposed on the motor 50 based on the value of the current detected by the current detection circuit 43. Specifically, the soft no-load rotation detector 360 detects the load imposed on the motor 50 when the current variation and the amount of current increase are greater than respective thresholds. Upon detecting the load, the soft no-load rotation detector 360 outputs a soft no-load rotation cancellation signal to the PWM generator 340.

The rotational speed calculator 390 calculates the actual rotational speed of the motor 50 based on the positional signal input from the position detection circuit 52. Then, the rotational speed calculator 390 outputs a calculation result to the PWM generator 340.

The PWM generator 340 generates a pulse width modulation (PWM) signal to drive the motor 50 so that the actual rotational speed of the motor 50 is the commanded rotational speed. Specifically, the PWM generator 340 generates the PWM signal based on the commanded rotational speed input (hereinafter, "input commanded rotational speed"), the calculation result input regarding the rotational speed, the drive-ON signal input (hereinafter, "input drive-ON signal") or the drive-OFF signal input (hereinafter, "input drive-OFF signal"), a soft no-load rotation enablement signal input (hereinafter, "input soft no-load rotation enablement signal") or the soft no-load rotation disablement signal input (hereinafter, "input soft no-load rotation disablement signal"), and presence/absence of the soft no-load rotation cancellation signal. The PWM generator 340 outputs the PWM signal generated to the drive controller 350.

The drive controller 350 generates the control command based on the PWM signal output from the PWM generator 340. The control command commands each switching element of the Motor driver 42 to turn ON or OFF. The drive controller 350 outputs the control command generated to the motor driver 42.

The electric work machine 10 includes a notifier 60. The notifier 60 is a light including at least one light emitting diode (FED). The work machine circuit 100 includes an indicator circuit 61. The indicator controller 380 controls a notification from the notifier 60 via the indicator circuit 61 based on the input soft no-load rotation enablement signal or the input soft no-load rotation disablement signal, and the input drive-ON signal or the input drive-OFF signal. When the soft no-load rotation enablement signal and the drive-ON signal are input, the indicator controller 380 notifies, via the notifier 60, that the soft no-load rotation control is enabled. For example, the indicator controller 380 makes the notifier 60 blink, to thereby notify that the soft no-load rotation control is enabled.

1-2. Motor Driving Process

Figure 5:
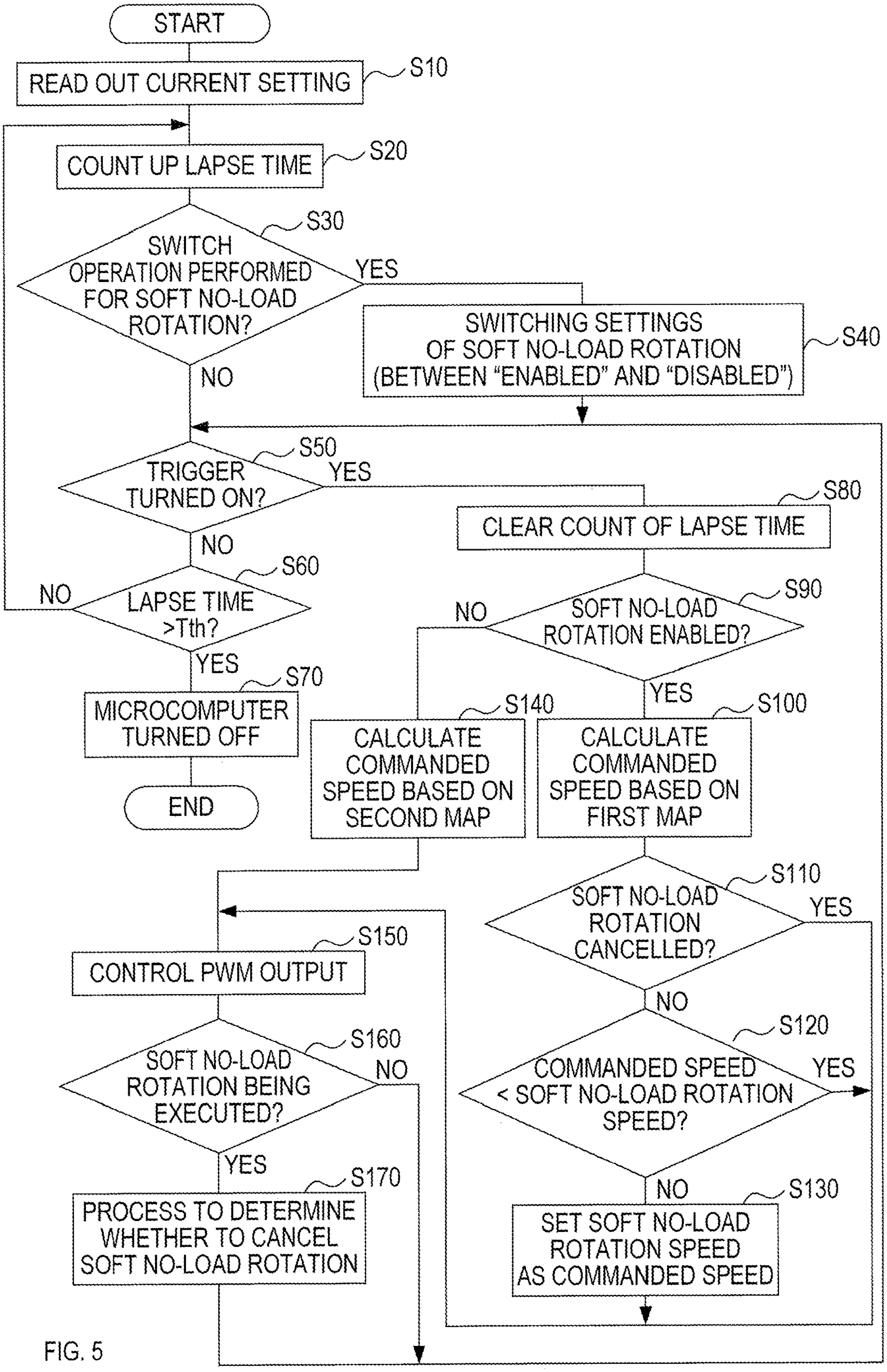
FIG. 5 is a flow chart showing a procedure of a motor drive process according to the first embodiment.

Referring to the flow chart of FIG. 5, explanations are given to a procedure of a motor driving process executed by the microcomputer 30. The microcomputer 30 starts the motor driving process upon being supplied with an electric power and then turned ON.

In S10, the microcomputer 30 reads out a current soft no-load rotation setting from the RAM 30*c*.

Subsequently, in S20, the microcomputer 30 counts up a lapse time. By counting up the lapse time, the microcomputer 30 measures a time period during which the trigger 12 remains in an OFF state.

Subsequently, in S30, the microcomputer 30 determines whether a switching operation of the soft no-load rotation control has been performed. If determining that the switching operation of the soft no-load rotation control has been performed (S30: YES), then the microcomputer 30 proceeds to a process of S40. If determining that the switching operation of the soft no-load rotation control has not been performed (S30: NO), then the microcomputer 30 proceeds to a process of S50.

In S40, the microcomputer 30 switches the soft no-load rotation settings. That is, when the soft no-load rotation control is currently set to be enabled, the microcomputer 30 sets the soft no-load rotation control to be disabled (disablement setting). Then, the microcomputer 30 stores the disablement setting of the soft no-load rotation control in the RAM 30*c*. Furthermore, when the soft no-load rotation control is currently set to be disabled, the microcomputer 30 sets the soft no-load rotation control to be enabled (enablement setting). Then, the microcomputer 30 stores the enablement setting of the soft no-load rotation control in the RAM 30*c*. Subsequently, the microcomputer 30 proceeds to a process of S50.

In S50, the microcomputer 30 determines whether the trigger 12 is in the ON-state. That is, the microcomputer 30 determines whether the second power ON-signal has been output from the second speed setter 12*a*. If determining that the trigger 12 is in the OFF-state (S50: NO), then the microcomputer 30 proceeds to a process of S60.

In S60, the microcomputer 30 determines whether the lapse time counted up in S20 is greater than a threshold time Tth. If determining that the lapse time is the threshold time Tth or less (S60: NO), then the microcomputer 30 returns to the process of S20. If determining that the lapse time is greater than the threshold time Tth (S60: YES), then the microcomputer 30 proceeds to a process of S70.

In S70, the microcomputer 30 is turned OFF and ends the motor driving process.

Furthermore, in S50, if determining that the trigger 12 is in the ON-state (S50: YES), the microcomputer 30 proceeds to a process of S80. In S80, in response to the trigger 12 having been switched to the ON-state, the microcomputer 30 clears counting of the lapse time and then proceeds to a process of S90.

In S90, the microcomputer 30 determines whether the soft no-load rotation control is currently set to be enabled. If determining that the soft no-load rotation control is set to be enabled (S90: YES), then the microcomputer 30 proceeds to a process of S100.

In S100, the microcomputer 30 calculates the commanded rotational speed of the motor 50 based on the first map, the first resistance value signal (that is, the selector dial position of the speed adjusting selector dial 14), and the second resistance value signal (that is, the actual pulled distance of the trigger 12).

Subsequently, in S110, the microcomputer 30 determines whether the soft no-load rotation control has been cancelled. That is, the microcomputer 30 determines whether the load has been imposed on the motor 50. The load imposed on the motor 50 is a load to be applied to the motor 50 from the workpiece. If determining that the soft no-load rotation control has been already cancelled (S110: YES), the microcomputer 30 proceeds to a process of S150. If determining that the soft no-load rotation control has not been cancelled (S110: NO), then the microcomputer 30 proceeds to a process of S120.

In S120, the microcomputer 30 determines whether the commanded rotational speed calculated in S100 is less than the soft no-load rotational speed. If determining that the commanded rotation speed is less than the soft no-load rotational speed (S120: YES), then the microcomputer 30 proceeds to a process of S150. If determining that the commanded rotational speed is the soft no-load rotational speed or higher (S120: NO), the microcomputer 30 proceeds to a process of S130.

In S130, the microcomputer 30 sets the commanded rotational speed to the soft no-load rotational speed. As a result, the actual rotational speed of the motor 50 is suppressed to the soft no-load rotational speed or less during execution of the soft no-load rotation control.

Furthermore, in S90, if determining that the soft no-load rotation control is set to be disabled (S90: NO), then the microcomputer 30 proceeds to a process of S140.

In S140, the microcomputer 30 calculates the commanded rotational speed of the motor 50 based on the second map, and the first and second resistance value signals.

Subsequently, in S150, the microcomputer 30 generates the PWM signal based on at least one of the commanded rotational speeds calculated in S110, S130, or S140. Then, the microcomputer 30 generates the control command based on the PWM signal generated, and outputs the control command generated to the motor driver 42.

Subsequently, in S160, the microcomputer 30 determines whether the soft no-load rotation control is being executed. If determining that the soft no-load rotation control is being executed (S160: YES), then the microcomputer 30 proceeds to a process of S170. If determining that the soft no-load rotation control is being cancelled (S160: NO), then the microcomputer 30 returns to the process of S50.

In S170, the microcomputer 30 determines whether to cancel the soft no-load rotation control. Specifically, upon detecting the load imposed on the motor 50, the microcomputer 30 determines to cancel the soft no-load rotation control based on the current variation and the amount of current increases. If determining to cancel the soft no-load rotation control, then the microcomputer 30 cancels the soft no-load rotation control. That is, the microcomputer 30 sets the upper limit of the commanded rotational speed to the maximum value. If not detecting the load imposed on the motor 50, then the microcomputer 30 determines to maintain execution of the soft no-load rotation control. Once the soft no-load rotation control is cancelled, the microcomputer 30 maintains cancellation of the soft no-load rotation control even when the load is no longer imposed on the motor 50 during the cancellation. That is, once cancelling the soft no-load rotation control, the microcomputer 30 calculates the commanded rotation speed, based on the first map, so as to set the actual rotational speed to be the maximum value or less even when the load is no longer imposed on the motor 50 during the cancellation. After the process of S170, the microcomputer 30 returns to the process of S50.

1-3. Operation

Figure 6:
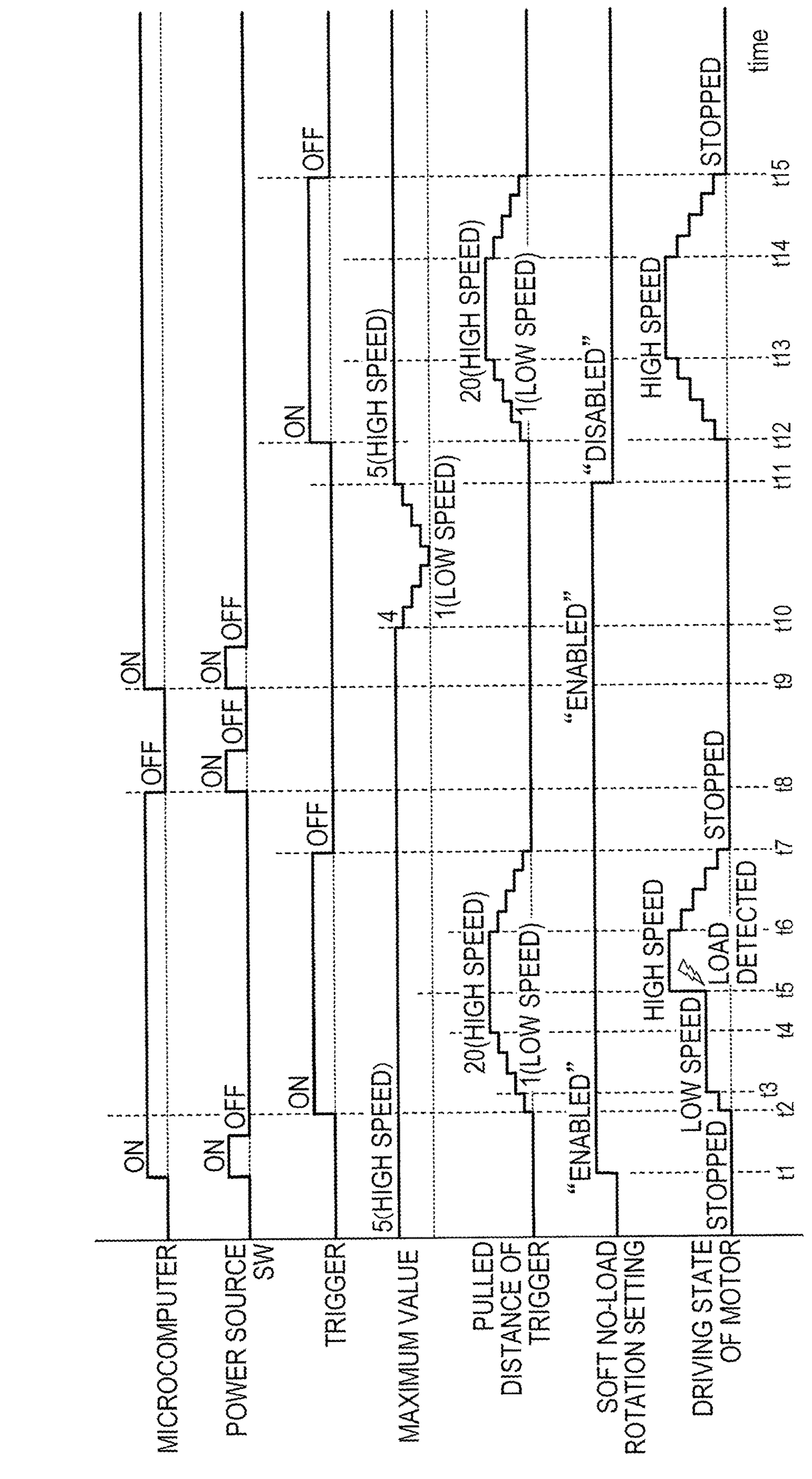
FIG. 6 is a time chart showing (i) ON and OFF states of a power source of a microcomputer, a main power supply switch, and the trigger, (ii) a maximum value (desired value) of a rotational speed, (iii) the actual pulled distance of the trigger, (iv) soft no-load rotation settings, and (v) a driving state of the motor.

The time chart in FIG. 6 shows a time variation of (i) ON/OFF of a power source of the microcomputer 30, the main power switch 13, and the trigger 12, (ii) the maximum value of the rotational speed, (iii) the actual pulled distance of the trigger 12, (iv) the soft no-load rotation settings, and (v) a motor driving state in the case of executing the motor driving process shown in FIG. 5.

At a time point t1, in response to the main power switch 13 being pressed and the first power-ON signal being output, the microcomputer 30 is turned ON. Then, the soft no-load setting (here, “enablement”) is read out. The selector dial position of the speed adjusting selector dial 14 is set to “5”.

At a time point t2, in response to the trigger 12 being pulled by the user and the second power-ON signal being output, the motor 50 starts driving. During a time period from the time point t2 through a time point t4, the actual pulled distance of the trigger 12 increases. During a time period from the time point t4 through a time point t6, the actual pulled distance of the trigger 12 is maintained at a pulled distance. During a time period from the time points t2 through t3, the actual rotational speed of the motor 50 increases and reaches to the soft no-load rotational speed (low speed) at the time point t3. During a time period from the time points t3 through t5, the actual rotational speed is maintained at the soft no-load rotational speed.

Then, at the time point t5, the load is detected and the soft no-load rotation control is cancelled. As a result of cancellation of the soft no-load rotation control, the actual rotational speed of the motor 50 increases to a high speed from the soft no-load rotational speed. During a time period from the time point 16 through a time point t7, the actual pulled distance of the trigger 12 decreases. As a result of a decrease in the actual pulled distance of the trigger 12, the actual rotational speed of the motor 50 decreases. At the time point t7, the trigger 12 is turned OFF and the second power-OFF signal is output.

Then, at the time point t8, the main power switch 13 is pressed. In response to the first power-OFF signal being output, the microcomputer 30 is turned OFF.

Subsequently, at the time point t9, the Main power switch 13 is pressed. In response to the first power-ON signal being output, the microcomputer 30 is turned ON.

Subsequently, during a time period from the time point t10 through a time point t11, the speed adjusting selector dial 14 is rotated by the user in the single reciprocating motion while the trigger 12 is turned OFF. Consequently, at the time point t11, the soft no-load rotation settings are switched from enablement to disablement.

Subsequently, at a time point t12, the trigger 12 is pulled by the user. In response to the second power-ON signal being output to the switch input determiner 320, the microcomputer 30 starts driving the motor 50. During a time period from the time point t12 through a time point t13, the actual pulled distance of the trigger 12 increases. As the actual pulled distance of the trigger 12 increases, the actual rotational speed of the motor 50 increases. During a time period from the time point t13 through a time point t14, the actual pulled distance of the trigger 12 is maintained at the maximum pulled distance. The actual rotational speed of the motor 50 is maintained at a maximum rotational speed (or a maximum rotational frequency). During a time period from the time point t14 through a time point #15, the actual pulled distance of the trigger 12 decreases. As the actual pulled distance of the trigger 12 decreases, the actual rotational speed of the motor 50 decreases. At the time point t15, the trigger 12 is turned OFF and the second power-OFF signal is output.

1-4. Effects

The first embodiment detailed above brings effects to be described below.

(1) Before the load is imposed on the motor 50 during the soft no-load rotation control being enabled, the user can manually adjust the actual rotational speed based on the first correspondence data until the actual rotational speed reaches the specified rotational speed. Furthermore, before the load is imposed on the motor 50 during the soft no-load rotation control being enabled, the user can manually adjust the actual rotational speed in a low speed range, to thereby determine the position of the electric work machine 10 with respect to the workpiece. Still further, during the soft no-load rotation control being disabled, the user can manually adjust the actual rotational speed based on the second map regardless of whether the load is imposed on the motor 50. The third through sixth correspondence data, which respectively correspond to the selector dial positions "1" through "4", are at least partly distinctive from the first correspondence data. Thus, the user can distinguish occasions to enable or disable the soft no-load rotation control based on physical senses.

(2) During the soft no-load rotation control being disabled, the commanded rotational speed is calculated based on one of the third through seventh correspondence data corresponding to the maximum value set (set maximum value). Thus, the user can manually adjust the actual rotational speed for the respective maximum values.

(3) After the load is imposed on the motor 50 during the soft no-load rotation control being enabled, the commanded rotational speed is calculated based on the same first correspondence data regardless of the set maximum value. Thus, during the soft no-load rotation control being enabled, the user can manually vary the actual rotational speed at the same variation rate regardless of the set maximum value. That is, during the soft no-load rotation control being enabled, it is possible to reduce workload of the user to adjust the actual rotational speed. In other words, it is possible to improve workability of the electric work machine 10.

(4) Once the soft no-load rotation control is cancelled upon the load being imposed on the motor 50, the commanded rotational speed is calculated based on the first map even when the load is no longer imposed on the motor 50 during cancellation of the soft no-load rotation control. The motor 50 is controlled based on the commanded rotational speed calculated. Thus, it is possible to suppress reduction in the actual rotational speed when the load is temporality reduced during the work.

2. Second Embodiment 2-1. Difference(s) from First Embodiment

The second embodiment has the same basic configuration as that of the first embodiment. Thus, hereinafter descriptions are provided to a difference from the first embodiment. The same reference numerals as those in the first embodiment indicate the same configuration, and reference of such a configuration should be made to the preceding descriptions.

In the first embodiment, during the soft no-load rotation control being cancelled while being enabled, the speed command calculator 310 calculates the commanded rotational speed corresponding to the actual pulled distance of the trigger 12 based on the first map. On the other hand, in the second embodiment, during the soft no-load rotation control being cancelled while being enabled, the speed command calculator 310 sets the commanded rotational speed to the maximum value of the rotational speed set via the speed adjusting selector dial 14.

Figure 7:
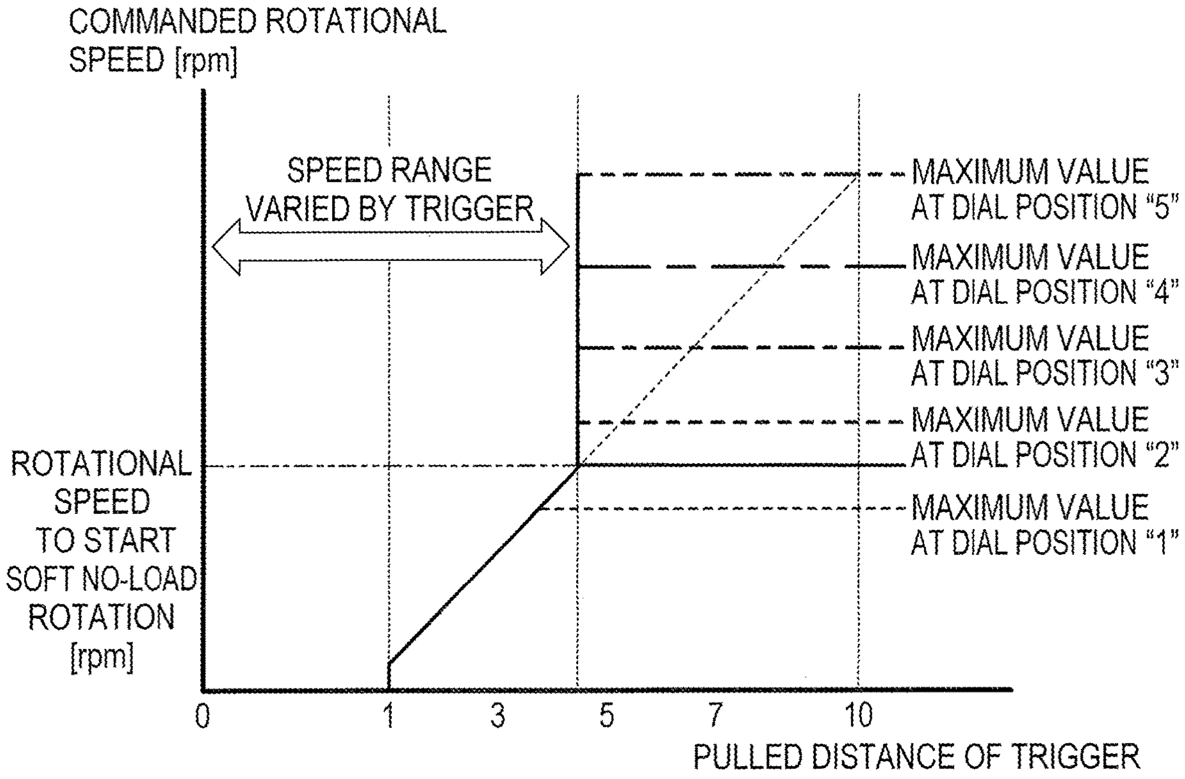
FIG. 7 is a graph, according to a second embodiment, of a commanded rotational speed with respect to an actual pulled distance of a trigger during a soft no-load rotation control of being enabled.
Figure 8:
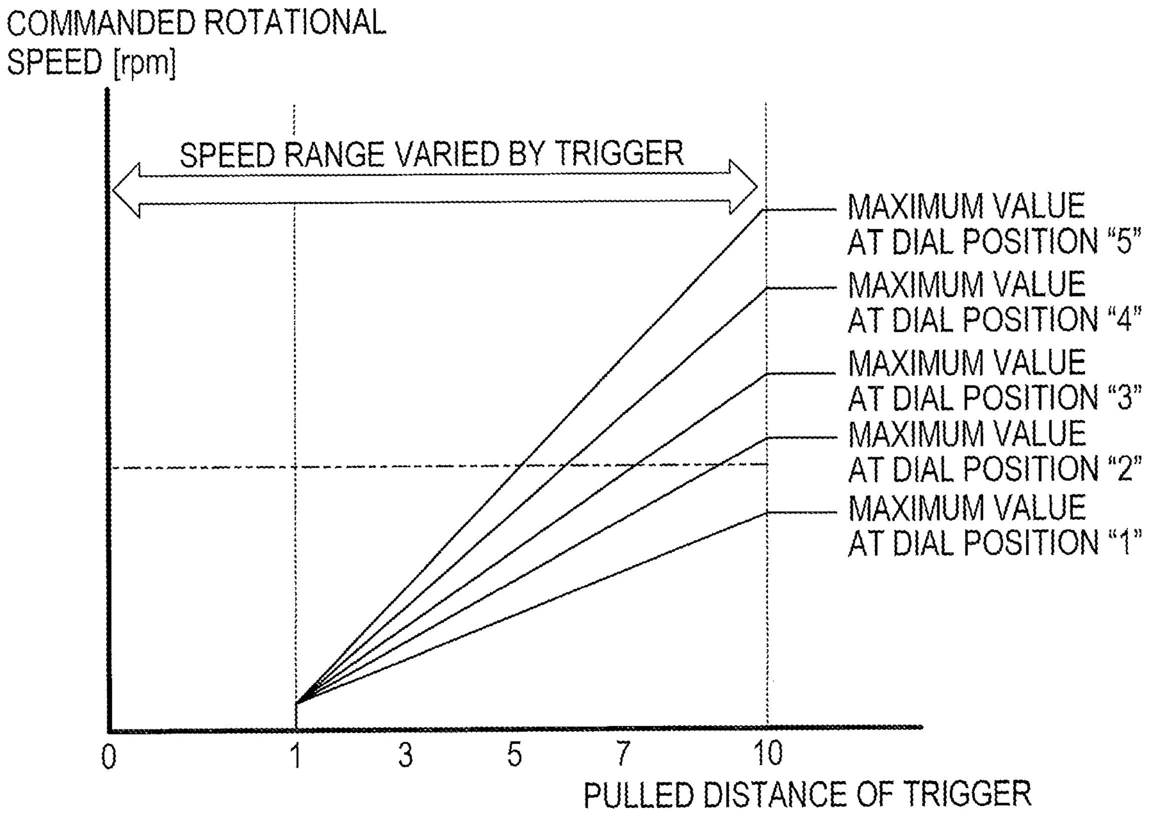
FIG. 8 is a graph, according to the second embodiment, of the commanded rotational speed with respect the actual pulled distance of the trigger during the soft no-load rotation control of being disabled.

FIG. 7 is a graph, according the present embodiment, showing the commanded rotational speed corresponding to the actual pulled distance of the trigger 12 during the soft no-load rotation control being enabled. FIG. 8 is a graph, according to the present embodiment, showing the commanded rotational speed corresponding to the actual pulled distance of the trigger 12 during the soft no-load rotation control being disabled.

The soft no-load rotational speed is set to a value between first and second maximum values. The first maximum value corresponds to the selector dial position "1". The second maximum value corresponds to the selector dial position "2". As shown in FIG. 7, when the selector dial position is "1" during the soft no-load rotation control being enabled, the commanded rotational speed increases to the maximum value in accordance with the actual pulled distance of the trigger 12. When the dial position is any one of "2" through "5" during the soft no-load rotation control being enabled, the commanded rotational speed increases to the soft no-load rotational speed in accordance with the actual pulled distance of the trigger 12. Upon the soft no-load rotation control being cancelled, each maximum value is set to the commanded value. Even when the load is no longer imposed on the motor 50 during cancellation of the soft no-load rotation control, the maximum value is set to the commanded value.

Accordingly, when the dial position is any one of "2" through "5" during the soft no-load rotation control being enabled, there is a first speed variation range in which the actual rotational speed varies in accordance with the actual pulled distance of the trigger 12. The first speed variation range corresponds to a low speed range from 0 (zero) to the soft no-load rotational speed. On the other hand, as show in FIG. 8, during the soft no-load rotation control being disabled, there is a second speed variation range in which the actual rotational speed varies in accordance with the actual pulled distance of the trigger 12. The second speed variation range corresponds to a speed range of all speeds from 0 (zero) to each maximum speed.

2-2. Effects

The second embodiment detailed above further brings effects to be described below, in addition to the effects (1), (2) of the first embodiment discussed above.

(5) After the load is imposed on the motor 50 during the soft no-load rotation control being enabled, the maximum value of the rotational speed is automatically set to the commanded value regardless of the actual pulled distance of the trigger 12. Thus, after the load is imposed on the motor 50 during the soft no-load rotation control being enabled, the user can work with the electric work machine 10 without adjusting the actual rotational speed.

(6) In a case where the load is imposed on the motor 50 and then the soft no-load rotation control is temporarily cancelled, the motor 50 can be rotated based on the maximum value even when the load is no longer imposed on the motor 50. Accordingly, when the load temporarily decreases during the work, it is possible to suppress the decrease in the actual rotational speed.

3. Other Embodiments

Although the embodiments of the present disclosure have been described hereinabove, the present disclosure is not limited to the above-described embodiments and may be practiced in various forms.

(a) In the embodiments above, the first and second maps may be stored in a built-in memory of the microcomputer 30 different from the ROM 30*b*. For example, the first and second maps may be stored in a hard disc, a removable media, or the like that is configured to be connectable to the microcomputer 30.

(b) The electric work machine 10 is not limited to a jigsaw. The electric work machine 10 may be any electric work machines including a trigger. For example, the electric work machine 10 may be an electric power tool. Examples of the electric power tool include a reciprocating saw, a hammer drill, and a chainsaw. Furthermore, the electric work machine 10 may be a gardening tool such as a grass mower.

(c) Two or more functions of one element of the aforementioned embodiment may be achieved by two or more elements, and one function of one element may be achieved by two or more elements. Furthermore, two or more functions of two or more elements may be achieved by one element, and one function achieved by two or more elements may be achieved by one element. Furthermore, a part of the configurations of the aforementioned embodiments may be omitted. Still further, at least a part of the configurations of the aforementioned embodiments may be added to or replaced with the configurations of the other above-described embodiments.

(d) In addition to the electric work machine described above, the present disclosure may also be practiced in various forms, such as a system including the electric work machine as a component, a program for causing the microcomputer 30 to function, a non-transitory tangible storage medium, such as a semiconductor memory, in which this program is stored, or a method for driving a motor.

What is claimed is:

1. An electric work machine comprising:

a motor configured to drive a tool that is attached to the electric work machine;

a drive switch configured to be manually moved by a user of the electric work machine so as to drive the motor;

a setting switch configured to selectively execute a first setting function and a second setting function in response to an operation by the user, the first setting function allowing the user to selectively set a first desired speed or a second desired speed of the motor, the second setting function allowing the user to selectively enable or disable a soft no-load rotation control, the soft no-load rotation control being set as to increase a rotational speed of the motor from an initial limit speed in accordance with a detection of a load on the motor; and a control circuit configured to:

in a case in which the soft no-load rotation control is enabled via the setting switch, (i) regardless of whether the first desired speed or the second desired speed is set during an actual moved distance of the drive switch within a first range from an initial position to a predetermined position, (i-i) increase an actual rotational speed of the motor continuously and non-piecewise as the actual moved distance increases in accordance with a first continuous speed variation profile; and (i-ii) maintain the actual rotational speed at the initial limit speed in response to the actual rotational speed reaching the initial limit speed, and (ii) based on a detection of a load on the motor, increase the actual rotational speed from the initial limit speed continuously and non-piecewise in accordance with the actual moved distance in response to a load on the motor being detected, and maintain the actual rotational speed at the first desired speed or the second desired speed in response to the actual rotational speed reaching the first desired speed or the second desired speed that has been set; and in a case in which the soft no-load rotation control is disabled via the setting switch, increase the actual rotational speed continuously and non-piecewise as the actual moved distance increases in accordance with a first individual continuous speed variation profile or a second individual continuous speed variation profile, respectively, the first desired speed or the second desired speed that has been set the first individual continuous speed variation profile and the second individual continuous speed variation profile being at least partially different from the first continuous speed variation profile.

2. The electric work machine according to claim 1, wherein the control circuit is configured to, in the case in which the soft no-load rotation control is enabled, vary the actual rotational speed in accordance with the actual moved distance in response to a no-load being detected after the load is detected.

3. The electric work machine according to claim 1, wherein the control circuit is configured to receive a specified signal, to thereby switch the soft no-load rotation control either to be enabled or disabled.

4. The electric work machine according to claim 1, wherein the drive switch is configured to output, to the control circuit, an electrical signal corresponding to the actual moved distance.

5. The electric work machine according to claim 4, wherein the electrical signal has a voltage that varies depending on the actual moved distance.

6. The electric work machine according to claim 1, wherein the control circuit is configured to detect the load.

7. The electric work machine according to claim 6, further comprising a current detection circuit configured to detect a value of a current flowing through the motor, wherein the control circuit is configured to detect the load based on the value of the current detected by the current detection circuit.

8. The electric work machine according to claim 1, further comprising a memory that stores the first continuous speed variation profile, the first individual continuous speed variation profile, and the second individual continuous speed variation profile.

9. An electric work machine comprising:

a motor configured to drive a tool that is attached to the electric work machine;

a drive switch configured to be manually moved by a user of the electric work machine so as to drive the motor;

a setting switch configured to selectively execute a first setting function and a second setting function in response to an operation by the user, the first setting function allowing the user to selectively set a first desired speed or a second desired speed of the motor, the second setting function allowing the user to selectively enable or disable a soft no-load rotation control, the soft no-load rotation control being set as to increase a rotational speed of the motor from an initial limit speed in accordance with a detection of a load on the motor; and a control circuit configured to:

in a case in which the soft no-load rotation control is enabled via the setting switch, (i) regardless of whether the first desired speed or the second desired speed is set, during an actual moved distance of the drive switch within a first range from an initial position to a predetermined position (i-i) increase an actual rotational speed of the motor continuously and non-piecewise as the actual moved distance increases in accordance with a first continuous speed variation profile; and (i-ii) maintain the actual rotational speed at the initial limit speed in response to the actual rotational speed reaching the initial limit speed, and (ii) in response to a load on the motor being detected, increase the actual rotational speed from the initial limit speed to the first desired speed or the second desired speed that has been set, independently of the actual moved distance, and maintain the actual rotational speed at the first desired speed or the second desired speed; and in a case in which the soft no-load rotation control is disabled via the setting switch, increase the actual rotational speed continuously and non-piecewise as the actual moved distance increases in accordance with a first individual continuous speed variation profile or a second individual continuous speed variation profile, respectively, based on the first desired speed or the second desired speed that has been set via the setting switch, the first individual continuous speed variation profile and the second individual continuous speed variation profile being at least partially different from the first continuous speed variation profile.

10. The electric work machine according to claim 9, wherein the control circuit is configured to, in the case in which the soft no-load rotation control is enabled, maintain the actual rotational speed at the first desired speed or the second desired speed set via the setting switch in response to a no-load being detected after the load is detected.

11. The electric work machine according to claim 9, further comprising a memory that stores the first continuous speed variation profile, the first individual continuous speed variation profile, and the second individual continuous speed variation profile.

12. A method of controlling a motor of an electric work machine, the method comprising:

selectively switching a soft no-load rotation control either to be enabled or disabled in response to a user's operation, the soft no-load rotation control being set as to increase a rotational speed of the motor from an initial limit speed in accordance with a detection of a load on the motor;

selectively setting a first desired speed or a second desired speed of the motor in response to the user's operation;

manually moving a drive switch of the electric work machine so as to drive the motor; and in a case in which the soft no-load rotation control is enabled, (i) regardless of whether the first desired speed or the second desired speed is set, during an actual moved distance of the drive switch within a first range from an initial position to a predetermined position, increasing an actual rotational speed of the motor continuously and non-piecewise as the actual moved distance increases in accordance with a first continuous speed variation profile and maintaining the actual rotational speed at the initial limit speed in response to the actual rotational speed reaching the initial limit speed, (ii) based on a detection of a load on the motor increasing the actual rotational speed from the initial limit speed continuously and non-piecewise in accordance with the actual moved distance and maintaining the actual rotational speed at the first desired speed or the second desired speed in response to the actual rotational speed reaching the first desired speed or the second desired speed that has been set; and in a case in which the soft no-load rotation control is disabled, increasing the actual rotational speed continuously and non-piecewise as the actual moved distance increases in accordance with a first individual continuous speed variation profile or a second individual continuous speed variation profile, respectively, based on the first desired speed or the second desired speed that has been set, the first individual continuous speed variation profile and the second individual continuous speed variation profile being at least partially different from the first continuous speed variation profile.

* * * * *